United States Patent
Zhang et al.

(10) Patent No.: US 11,774,940 B2
(45) Date of Patent: Oct. 3, 2023

(54) REDUNDANT TOUCHLESS INPUTS FOR AUTOMATION SYSTEM

(71) Applicant: Rockwell Automation Technologies, Inc., Mayfield Heights, OH (US)

(72) Inventors: Yanbin Zhang, Shanghai (CN); Xiaobo Peng, Shanghai (CN); Gary D. Dotson, Muskego, WI (US); Christopher G. Mason, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 170 days.

(21) Appl. No.: 17/216,103

(22) Filed: Mar. 29, 2021

(65) Prior Publication Data
US 2022/0308550 A1 Sep. 29, 2022

(51) Int. Cl.
*G05B 19/406* (2006.01)
*G06F 3/01* (2006.01)

(52) U.S. Cl.
CPC .......... *G05B 19/406* (2013.01); *G06F 3/017* (2013.01); *G05B 2219/31368* (2013.01); *G05B 2219/50198* (2013.01)

(58) Field of Classification Search
CPC ........ G05B 19/406; G05B 2219/31368; G05B 2219/50198; G05B 2219/35444;
(Continued)

(56) References Cited

U.S. PATENT DOCUMENTS 6,995,752 B2   2/2006   Lu
9,189,597 B2   11/2015  Bluemler et al.
(Continued)

FOREIGN PATENT DOCUMENTS

CN   102455803 B   7/2015
CN   104991519 B   9/2018
(Continued)

OTHER PUBLICATIONS

Brochure titled "FlightSense™ Time-of-Flight sensors", Publication date—unknown.
(Continued)

*Primary Examiner* — Grant Sitta

(57) ABSTRACT

A human machine interface for an industrial automation control system includes at least one touchless input device that is adapted to be in a first state in which said human machine interface provides a first input to said industrial automation control system or a second state in which said human machine interface provides a second input to said industrial automation control system. The at least one touchless input device includes first and second touchless input sensors each configured to detect hand gestures of an operator's hand to provide input to said human machine interface based upon said gestures. The first and second touchless input sensors can be identical with respect to each other or different. In one example, one or both of the sensors are both time-of-flight sensors and one of the sensors can be an electric field proximity sensor. A method of providing a human machine interface with at least one touchless input device is provided. In one embodiment, the touchless input device provides an emergency stop (Estop) switch device.

16 Claims, 5 Drawing Sheets

(58) Field of Classification Search
CPC .............. G05B 19/409; G05B 19/0421; G05B 2219/24182; G06F 3/017
See application file for complete search history.

(56) References Cited

U.S. PATENT DOCUMENTS

| | | |
|---|---|---|
| 2012/0095575 A1 | 4/2012 | Meinherz et al. |
| 2015/0095855 A1* | 4/2015 | Bai ...................... G06F 16/5846 715/863 |
| 2015/0144767 A1* | 5/2015 | Drader .................... G01S 17/08 250/206.1 |
| 2015/0253860 A1* | 9/2015 | Merics ................. G06F 3/04812 715/863 |
| 2017/0351336 A1 | 12/2017 | Yang et al. |
| 2018/0059839 A1 | 3/2018 | Kim et al. |
| 2018/0314230 A1* | 11/2018 | Adler ................... G05B 19/409 |
| 2018/0349373 A1 | 12/2018 | Sauerwein, Jr. |
| 2021/0166553 A1* | 6/2021 | Pedersen ................ H01H 3/022 |

FOREIGN PATENT DOCUMENTS

| | | |
|---|---|---|
| EP | 2 442 196 A2 | 4/2012 |
| EP | 2 977 872 A1 | 1/2016 |
| WO | WO 02/35461 A1 | 5/2002 |
| WO | WO 2009/024510 A1 | 2/2009 |

OTHER PUBLICATIONS

Brochure titled "Microchip GestIC® Technology", Publication date—2011.
Extended European Search Report dated Aug. 19, 2022 for Application No. EP 22 16 3246.
Microchip Technology Inc., publication titled "Microchip GestIC® Design Guide", DS40001716C, Jul. 14, 2015.

\* cited by examiner

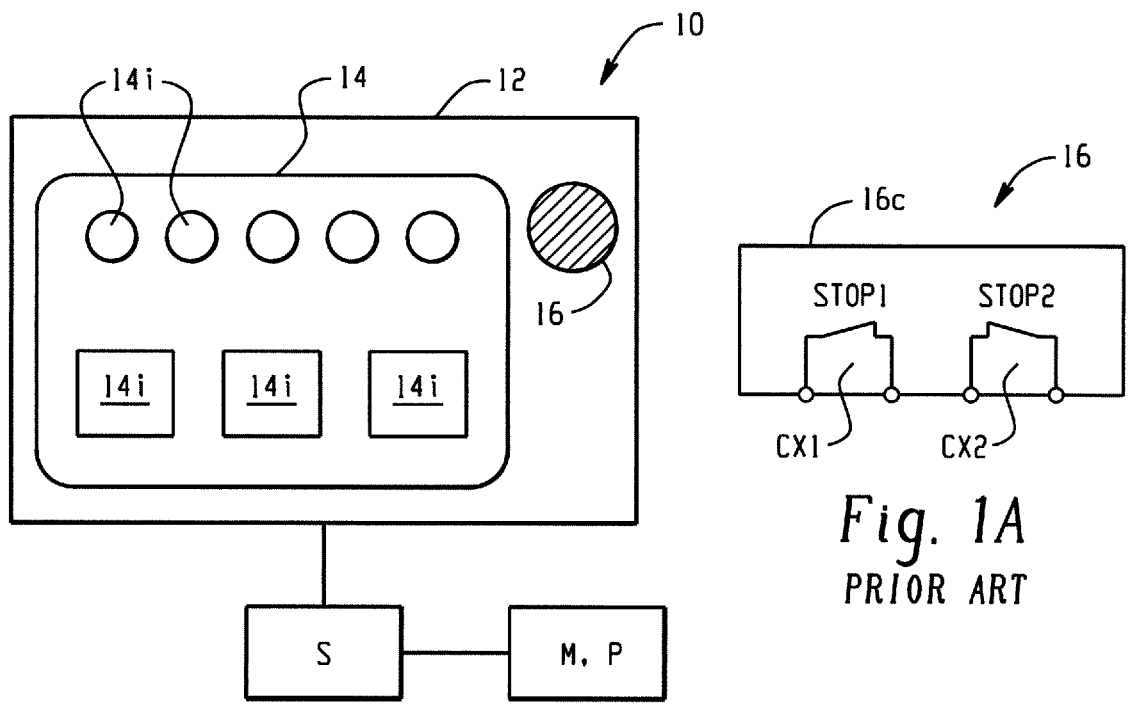
Fig. 1
PRIOR ART
Fig. 1A
PRIOR ART
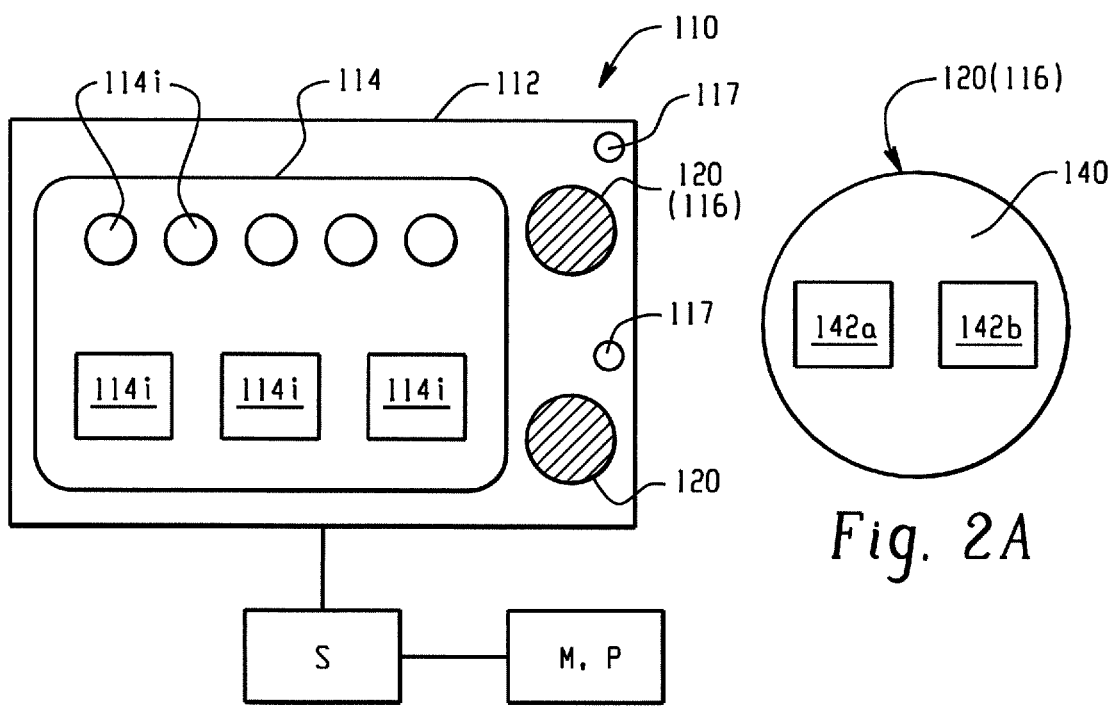
Fig. 2
Fig. 2A

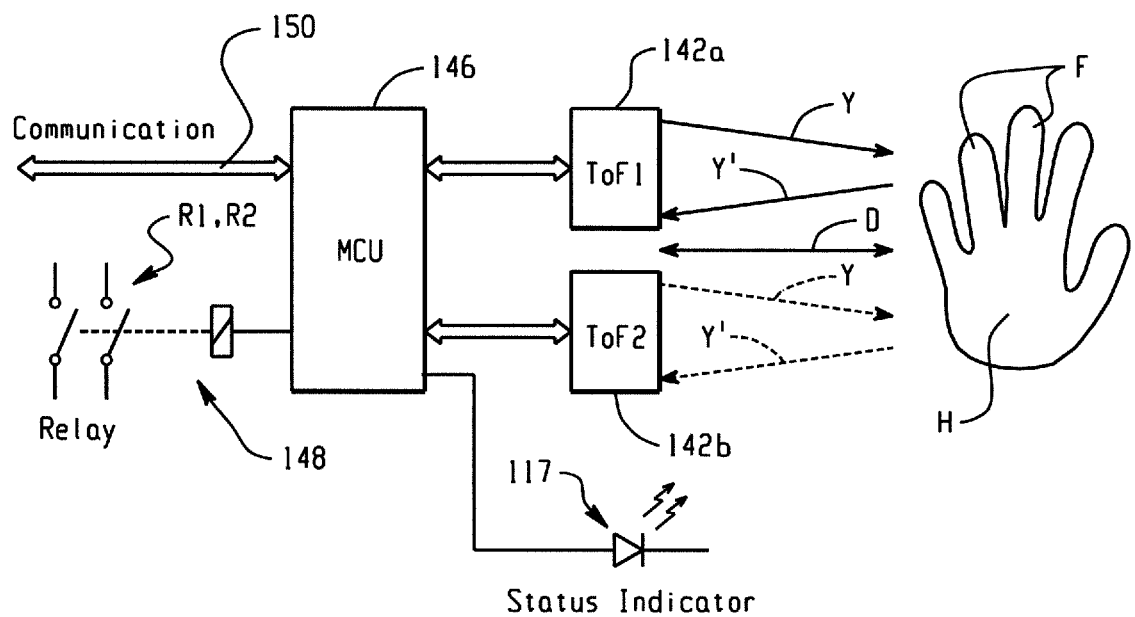
Fig. 3
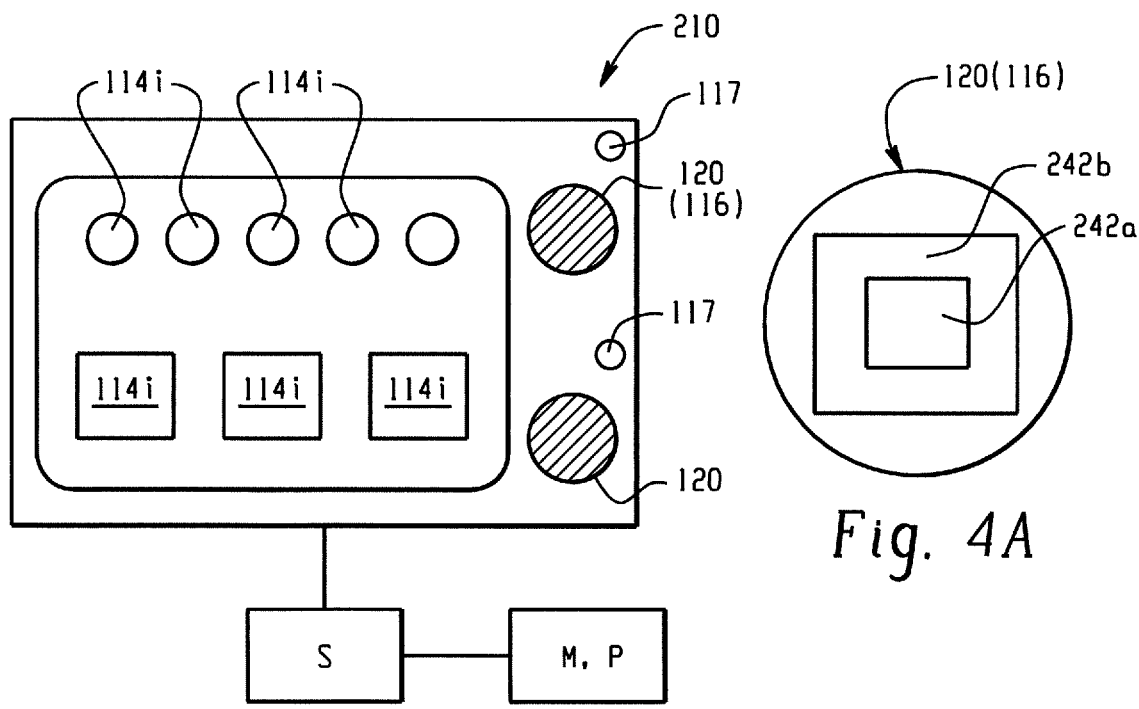
Fig. 4
Fig. 4A

| Name | Description |
|---|---|
| Single Tap | Press a virtual 'button' on top of the sensor, once |
| Double Tap | Press a virtual 'button' on top of the sensor, twice |
| Single Swipe | Slide hand left to right or from right to left over the sensor |
| Double Swipe | Slide hand from left to right and back to left or from right to left and back to right over sensor |

REDUNDANT TOUCHLESS INPUTS FOR AUTOMATION SYSTEM

BACKGROUND INFORMATION

Industrial automation systems typically include a human machine interface (HMI) that provides one of several paths by which a human operator of the automation system provides input to and receives output from the system. The HMI thus typically includes conventional computer system input/output devices such as a keyboard, keypad, one or more switches, a visual display such as a touchscreen display for combined input and output, indicator lights, and the like. These known HMI devices require physical contact between the operator's body (e.g., his or her fingers) and the HMI device which can be undesirable in certain situations such as in a clean-room environment, a food service environment, and other environments where possible contamination of the operator's hands and/or of the HMI itself is highly undesired. Also, physical contact with the HMI can increase the risk of person-to-person transmission of pathogens such as the Covid-19 virus and others.

In industrial automation systems, the HMI typically also includes an emergency stop (Estop) switch (button) by which an operator can stop or at least slow the machine(s) being controlled in an emergency or other situation. As with other HMI inputs, this Estop switch must be physically contacted by the operator's hand/finger(s) which is sometimes undesirable as noted above. Also, these known Estop switches typically include redundant (dual) mechanical electrical contacts which lead to an increase in cost, size, and wiring requirements. Such mechanical contacts in known Estop switches and other HMI switches are also susceptible to physical damage or contamination from liquid, dust, vapors, corrosion, and the like.

Touchless input devices have heretofore been deemed unsuitable for industrial automation applications where redundancy is required. Known industrial automation HMI devices have not included touchless input devices that implement a redundant operation scheme to prevent inadvertent actuation of the touchless input device as could lead to an unsafe or other undesired condition.

Thus, while known HMI and Estop devices have been found to be generally satisfactory, a need has been identified for new and improved HMI and Estop systems/devices that overcome the above deficiencies and others while providing superior overall results.

BRIEF DESCRIPTION

In accordance with one aspect of the present development, a human machine interface for an industrial automation control system includes at least one touchless input device that is adapted to be in a first state in which said human machine interface provides a first input to said industrial automation control system or a second state in which said human machine interface provides a second input to said industrial automation control system. The at least one touchless input device comprises first and second touchless input sensors each configured to detect hand gestures of an operator's hand to provide input to said human machine interface based upon said gestures. The first and second touchless input sensors can be identical with respect to each other or different.

In accordance with another aspect of the present development, a method of controlling a human machine interface for an industrial automation control system includes setting a state of a touchless input device of the human machine interface to a first state and providing a first input to the industrial automation control system. The method further includes using first and second touchless sensors to detect a first hand gesture and changing the state of the touchless input device from the first state to a second state and providing a second input to the industrial automation control system when both the first and second touchless sensors to detect said first hand gesture.

In accordance with a further aspect of the present development, the method includes changing the state of the touchless input device from the second state back to the first state and providing the first input to the industrial automation control system when at least one of the first and second touchless sensors detects a second hand gesture that is different from the first hand gesture.

In accordance with another aspect of the present development, a method of controlling a human machine interface for an industrial automation control system includes setting a state of a touchless Estop device of the human machine interface to a first state and providing a first input to the industrial automation control system. The method includes using first and second touchless sensors to detect a first hand gesture and changing the state of the touchless Estop device from the first state to a second state and providing a second input to the industrial automation control system when at least one of said first and second touchless sensors detects the first hand gesture. The second input to the industrial automation control system corresponds to an emergency stop command.

BRIEF DESCRIPTION OF THE DRAWINGS

FIG. 1 (prior art) illustrates an example of a known human machine interface (HMI) device for an industrial automation system including a known emergency stop (Estop) device.

FIG. 1A (prior art) provides a detail view of the Estop switch of the HMI of FIG. 1.

FIG. 2 shows a human machine interface (HMI) device for an industrial automation system provided in accordance with an embodiment of the present development and including one or more integrated touchless input devices such as an emergency stop (Estop) input device.

FIG. 2A provides a detail view of the touchless input switch device of the HMI of FIG. 2.

FIG. 3 illustrates an embodiment of the touchless input device of the HMI of FIG. 2;

FIG. 4 is similar to FIG. 2 but illustrates the HMI with one or more touchless input devices formed in accordance with a second embodiment of the present disclosure.

FIG. 4A provides a detail view of the touchless input switch device of the HMI of FIG. 4.

DETAILED DESCRIPTION

Figures 5, 6:
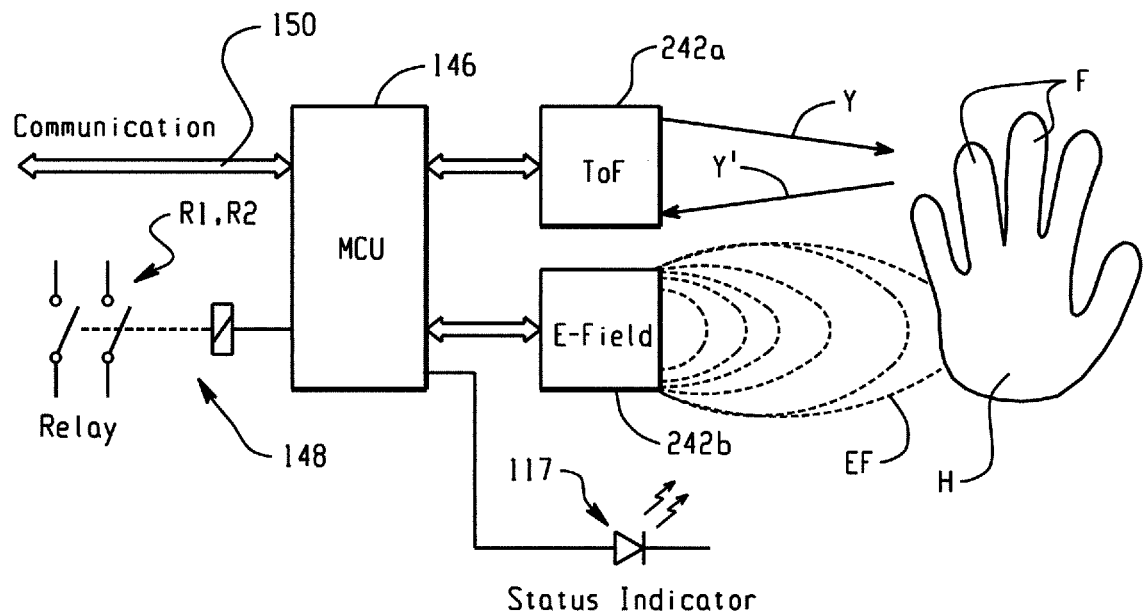
FIG. 5 illustrates an embodiment of the touchless input device of the HMI of FIG. 4.
FIG. 6 is a table that illustrates examples of suitable input gestures for actuating the touchless input devices of FIGS. 2-5.

FIG. 1 (prior art) illustrates an example of a known human machine interface (HMI) device 10 for an industrial automation system. The HMI 10 is particularly adapted for use in connection with an industrial automation control system S that controls an industrial machine M and/or process P. The HMI 10 thus typically includes conventional computer system input/output devices such as a keyboard, keypad, one or more switches, a visual display such as a touchscreen display for combined input and output, indicator lights, and the like. The illustrated HMI 10 includes a housing 12 that supports a conventional touchscreen display 14 for output of visual information to a human operator and for receiving touchscreen input from the operator. In one example, the touchscreen display 14 is a touch-resistive or touch-capacitive display that requires physical contact from an operator's bare finger. As is generally known, the touchscreen display 14 includes one or more visual icons or other graphical elements 14i that provide visual information to a human operator user, and the user physically touches one or more of these graphical elements 14i to provide input to the HMI and control system S. The known HMI 10 further includes a conventional mechanical emergency stop (Estop) switch 16 (or "button") by which an operator can stop or at least slow the machine(s) M or process(es) P being controlled in an emergency or other situation. This Estop switch 16 must be physically contacted and moved/actuated by the operator's hand/finger(s) which is sometimes undesirable as noted above. Also, as shown in FIG. 1A, such known Estop switches 16 typically include a cover 16c operatively engaged with one or redundant (dual) mechanical electrical contacts CX1,CX2 which result in an increase in cost, size, and wiring requirements. When manually actuated, the electrical contact(s) CX1,CX2 provide(s) an emergency stop signal to the industrial automation control system S. Such mechanical contacts CX1,CX2 are also susceptible to physical wear, damage, and/or contamination from liquid, dust, vapors, corrosion, and the like.

FIG. 2 shows a human machine interface (HMI) device 110 provided in accordance with an embodiment of the present development and including one or more redundant touchless input devices 120. As indicated by a broken line at 16, the HMI device 110 can optionally also include a conventional mechanical emergency stop (Estop) switch 16 operatively connected to the control system S as described above in addition to the one or more redundant touchless input devices 120. The HMI 110 is particularly adapted for use in connection with an industrial automation control system S that controls an industrial machine M and/or process P. In the illustrated example, the HMI 110 includes a housing 112 that supports a touch screen display 114 that can be the same or similar to the touchscreen display 14 described above, except as otherwise described and/or shown herein. In one example, the touchscreen display 114 is a touch-resistive or touch-capacitive display. As is generally known, the touchscreen display 114 includes one or more visual icons or other graphical elements 114i that provide visual information to a human operator user, and the user physically touches one or more of these graphical elements 114i to provide input to the HMI and control system S. The HMI can also include conventional computer system input/output devices such as a keyboard, keypad, one or more switches, a visual display, one or more status indicator lights (such as one or more LED indicator lights 117 connected to the housing 112) and the like. Unlike the conventional HMI 10, however, the HMI 110 includes one or more touchless input devices 120 for providing touchless input to the industrial automation control system S and its controlled machine(s) M and/or process(es) P for input and output of data with respect thereto. As illustrated herein, the touchless input devices 120 are supported by the housing 112 but are separate from the touchscreen display 114, but some or all of the touchless input devices 120 can alternatively or additionally be integrated into the touchscreen display 114 and provided as a part thereof or, the touchless input device(s) 120 can be separate (detached) from the main HMI housing 112 and located in one or more locations that are adjacent the HMI housing 112 or remote from the HMI housing 112. Similarly, as shown herein the visual status indicator light(s) 117 are shown herein as being connected to the main HMI housing 112 separate from the touchscreen display 114, but the indicator lights 117 can alternatively be provided by illuminated portions of the touchscreen display 114, illuminated portions of the touchless input devices 120, and/or located elsewhere. In one example, the touchscreen display 114 is entirely replaced by one or multiple touchless input devices 120 for providing input to the system S and controlled machine/process M/P. In another embodiment, the one or more visual status indicator lights 117 are included as part of the touchless input device 120, itself, (e.g., as one or more pixels of a video display screen) such that part or all of the touchless input device 120 is illuminated in the color of the status indicator light 117 (e.g., red, green, or another color) when the indicator light 117 is activated.

Each touchless input device 120 is structured and configured to allow a human operator to provide one or more touchless (non-contact) gesture input commands to the HMI 110 for input to the industrial automation control system S and the machine and/or process M,P controlled thereby. In this manner, each touchless input device 120 provides and acts as a virtual switch or virtual button adapted for touchless (contactless) operator input to the system S. As shown herein, according to the present development, at least one of the touchless input devices 120 is configured and adapted to function as a touchless emergency stop (Estop) input device 116 to stop or at least slow any machine(s) M and/or process(es) P controlled by the control system S to which the HMI 110 is operatively connected.

A touchless input device (such as the touchless Estop device 116) is shown separately in FIG. 2A and FIG. 3 comprises a base 140 such as a printed circuit board (PCB) that includes at least one and preferably first and second redundant touchless input sensors or sensor devices 142a, 142b connected thereto, along with an electronic processor such as a microcontroller (MCU). The touchless input sensors 142a,142b can be covered by glass or a clear polymer sheet. Each touchless input sensor 142a,142b is configured and adapted to detect touchless hand gestures of a human operator to provide input control signals to the HMI and control system S without any physical contact between the hand or fingers of the human operator and the sensor(s) 142a,142b or any other component. In the embodiment of FIG. 2A, the touchless input sensors 142a,142b are provided as time-of-flight (ToF) sensors connected in a parallel, redundant arrangement. The dual ToF sensors 142a,142b can be operated to scan the sensing field or target in a repetitive, alternating arrangement to avoid interference from one sensor to the other, or they can be operated to scan simultaneously in parallel with each other. Suitable ToF sensors are available commercially from STMicroelectronics under the trademark FLIGHTSENSE as one example, but it is not intended to limit the present disclosure to any particularly brand of sensor. The touchless input sensors 142a,142b each include a photon emitter and a photon sensor. As shown in FIG. 3, the photon emitter emits photons Y that are incident on a target (a human operator's hand H including the fingers F). The photons Y that are incident on the target are reflected by the target back toward the touchless input sensor 142a,142b where the reflected photons Y' are detected by the photon sensor. The photons Y associated with the first sensor 142a are shown with a solid line while the photons Y associated with the second sensor 142b are shown with a broken line. The touchless input sensors 142a,142b include or are otherwise operatively connected to an electronic processor 146 such as a microcontroller MCU that calculates the time-of-flight required for each photon Y emitted to travel from the photon emitter to the photon sensor, and the processor 146 uses the time data to derive a distance D and/or a change in distance between the target H,F and the touchless input sensors 142a,142b. The processor 146 is configured to detect and interpret movement or gestures of the target (hand H/fingers F) based upon changes in the time-of-flight and/or based upon changes in the distance D. The processor 146 is operatively connected to one or more control circuits 148 and communications channels 150 of the industrial control system S (such as the illustrated emergency power interrupt relays R1,R2) and the processor 146 provides output to the control circuit(s) 148 and communication channel(s) 150 that varies depending upon the gestures and/or changes in the gestures derived by the processor 146 from the time-of-flight and distance data such that the gestures derived by the processor 146 provide input to the control system S through the HMI 110. The processor 146 also controls the color and/or the on/off state of the one or more LED(s) 117 to provide a visual indication to the human operator of the state of the HMI 110 and control system S.

FIGS. 4, 4A, and 5 respectively correspond to FIGS. 2, 2A, and 3, but illustrate an alternative embodiment 210 of the HMI. The HMI 210 is identical to the HMI 110 except as otherwise shown and/or described herein and, thus, certain features are correspondingly identified but not described again here. One or more of the touchless input devices 120 of the HMI 210 includes touchless input sensors 242a,242b as an alternative to the touchless input sensors 142a,142b of the HMI 110. As indicated by a broken line at 16, the HMI device 210 can optionally also include a conventional mechanical emergency stop (Estop) switch 16 operatively connected to the control system S as described above in addition to the one or more redundant touchless input devices 120. Unlike the HMI 110, the touchless input sensors 242a,242b are different with respect to each other. As particularly shown in FIG. 5, a first one of the touchless input sensors 242a is provided as a time-of-flight (ToF) sensor identical to the sensor 142a of the HMI 110, while a second one of the touchless input sensors 242b is provided as a touchless sensor that is not a time-of-flight sensor such that the first and second input sensors are distinct from each other. In the illustrated embodiment of the HMI 210, the second touchless input sensor 242b comprises an electric field (E-Field) proximity sensor such as is available commercially from Microchip Technology under the registered trademark GESTIC® or another electric field sensor. The electric field proximity sensor 242b creates an electric field EF (FIG. 5) in the immediate region of the sensor 242b. The first and second sensors 242a,242b can operate simultaneously in parallel or alternatively in a rapidly alternating arrangement. When a user's hand H (including the fingers F thereof) enter the electric field EF, the electric field is perturbed and distorted in a manner that can used by the processor 146 to determine the location and change in location (gesture) of the hand H and fingers. The first and second touchless input sensors 242a,242b are redundant and operate in parallel or alternately to detect gesture input from the user's hand H and fingers F. The processor 146 is configured to detect and interpret movement or gestures of the target (hand H/fingers F) based upon the detected location of the hand/fingers H,F and/or changes in the detected location of the hand/fingers H,F. The processor 146 is operatively connected to one or more control circuits 148 and communications channels 150 of the HMI 210 (such as the illustrated emergency power interrupt relays R1,R2) and the processor 146 provides output to the control circuit(s) 148 and communication channel(s) 150 that varies depending upon the hand gestures and/or changes in the gestures derived by the processor 146 from the touchless sensors 242a,242b such that the hand gestures derived by the processor 146 provide input to the control system S through the HMI 210.

FIG. 6 provides an example of multiple hand gestures that can be determined by each touchless input device 120 of the HMI 110,210 according to an embodiment of the present disclosure including: (i) a single tap or single press (a single forward and back motion); (ii) a double tap or double press (a forward and back motion repeated twice in a row within a select time period such as 500 millisecond (ms)/half a second); (iii) a single swipe (a unidirectional swipe laterally or sideways to the left or to the right); and (iv) a double swipe (a bi-directional lateral or sideways swipe to the left then right or to the right then left within a select time period such as 500 ms half a second) or 1000 ms (1 full second)). Each of these gestures is associated with a unique output signal generated by the HMI 110,210 for input to the control system S. In one example, the single tap and single swipe gestures can be associated with low priority control of the machine M or process P that is non-critical and/or non-safety related. Thus, the single tap or single swipe gestures could be used to control ancillary functions where an erroneous input will have little or no adverse effect. On the other hand, the double tap and double swipe gestures that require more purposeful action on the part of the human operator are associated with high priority control of the machine M or process P that is safety related or otherwise critical. Thus, the double tap or double swipe gestures could be used to control primary functions of the machine M and/or process P (such as an emergency stop (E-stop) function) where an erroneously detected input would be undesirable.

Figure 7:
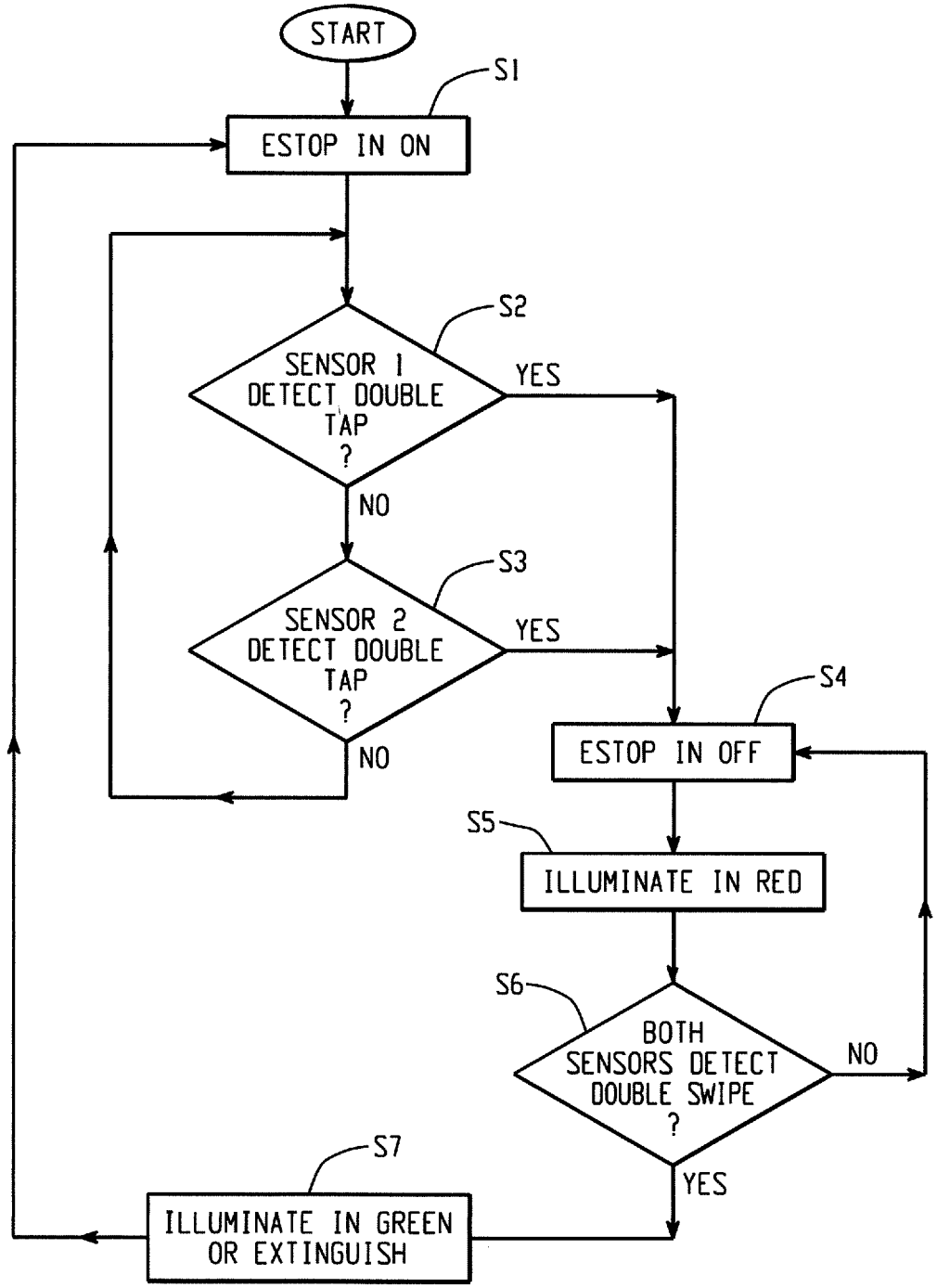
FIG. 7 is a flow chart that provides an example of a process for using any of the HMI touchless input devices of FIGS. 2-5 to implement a touchless emergency stop (Estop) device/system for an industrial automation system in accordance with one embodiment of the present development.

FIG. 7 is a flow chart that provides an example of a process for using any of the HMI touchless input devices 120 of FIGS. 2-5 to implement a touchless emergency stop (Estop) device/system for an industrial automation system S in accordance with one embodiment of the present development. In the illustrated example, the HMI 110,210 sets the E-stop state of the HMI 110,210 and control system S to "ON" (run) as starting condition (step S1) such that the machine M and/or process P is active. If the first touchless sensor 142a,242a detects a double tap gesture of a user's hand in a step S2 or if the second touchless sensor 142b,242b senses a double tap gesture of the user's hand H in a step S3 (i.e., two quick successive motions toward and away from the touchless sensors, the HMI 110,210 sets the E-stop state to "OFF" (S4) in a step S4 such that the machine M and/or process P is disabled (or slowed) and the HMI 110,210 controls the status indicator(s) 117 to be illuminated in a red or another select color in a step S5. As noted above, the visual indicator(s) 117 can be integrated into the touchless input device 120 so that the touchless input device is illuminated in the color of the visual indicator(s) 117. Any further sensing of a double tap gesture will be ignored once the Estop state is set to "OFF" to disable or slow the machine or process M,P. If both the first and second touchless input sensors 142a,142b (for the HMI 110) or both the first and second touchless input sensors 242a,242b (for the HMI 210) detect a double (bi-directional) swipe gesture caused by a back and forth lateral motion of the user's hand in a step S6, the HMI 110,210 carries out a step S7 in which the status indicator(s) 117 are changed to from the color red to another color (e.g., green) or are extinguished and control returns to step S1 in which the HMI 110,210 changes the state of the Estop back to "ON" (run) so that the machine or process M,P is activated or returned to full speed. Any further sensing of a double swipe gesture will be ignored once the Estop state is set to "ON" to activate the machine or process M,P.

Figure 8:
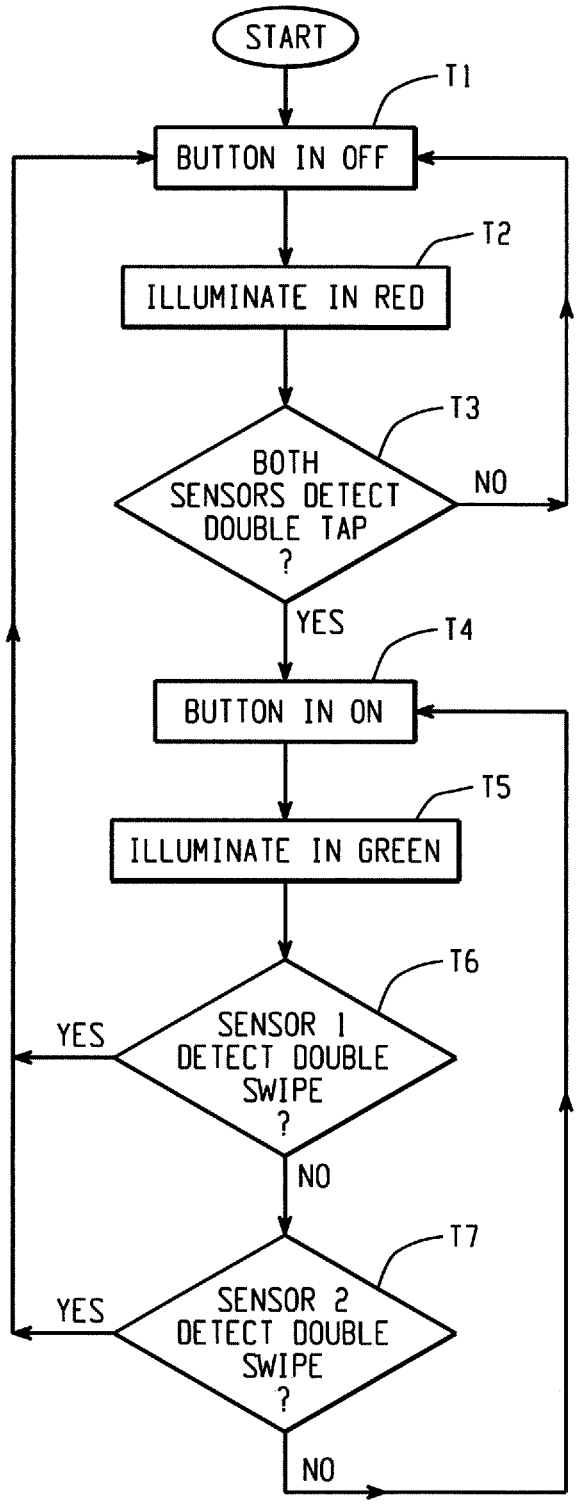
FIG. 8 is a flow chart that provides an example of a process for using any of the HMI touchless input devices of FIGS. 2-5 to implement a touchless HMI input device/ system for an industrial automation system in accordance with another embodiment of the present development.

The E-stop function of FIG. 7 is only one example of use of the touchless input devices 120 according to the present disclosure. FIG. 8 is a flow chart that provides an example of a process for using any of the HMI touchless input devices 120 of FIGS. 2-5 to implement a touchless HMI input device/system for an industrial automation system S in accordance with another embodiment of the present development. The HMI 110,210 sets the state of the touchless input device 120 or "button" to "OFF" as a starting or default condition in a step T1 and the industrial control system S is thus provided with input from the HMI 110,210 corresponding to the "OFF" state of the touchless input device 120. In a step T2, the HMI 110,210 illuminates the visual indicator(s) 117 in a first color (e.g., red) to indicate the "OFF" state of the touchless input device 120. As noted above, the visual indicator(s) 117 can be integrated into the touchless input device 120 so that the touchless input device is illuminated in the color of the visual indicator(s) 117. If both touchless input sensors 142a,142b (for the HMI 110) or both touchless input sensors 242a,242b (for the HMI 210) detect a double tap gesture (two successive forward and back hand movements within a select time period) in a step T3, the HMI 110,210 changes the operative state of the touchless input device 120 to "ON" in a step T4 and provides the industrial control system S with input corresponding to the "ON" state of the touchless input device 120. Any further sensing of a double tap gesture will be ignored once the state of the touchless input device 120 is set to "ON" (active) for the control system S. In a step T5, the HMI 110,210 changes to color of the visual indicator(s) 117 to a second color (e.g., green) or extinguishes the visual indicator(s) 117 to indicate the "ON" state of the touchless input device 120. If in steps T6 and T7 any one of the touchless sensors 142a,142b of the input device 120 (for the HMI 110) or any one of the touchless sensors 242a,242b (for the HMI 210) senses a double swipe gesture of the user's hand H (bi-directional hand movement within a select time period), the HMI 110,210 returns control to the step T1 and again sets the sets the state of the touchless input device 120 to "OFF" and the process repeats itself continuously. Any further sensing of a double swipe gesture will be ignored once the state of the touchless input device 120 is set to "OFF" for the control system S.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A human machine interface for an industrial automation control system, said human machine interface comprising at least one touchless input device that is adapted to be in a first state in which said human machine interface provides a first input to said industrial automation control system or a second state in which said human machine interface provides a second input to said industrial automation control system, wherein said at least one touchless input device comprises first and second touchless input sensors that are a same type of touchless input sensor and operate in an alternating arrangement with respect to one another to detect a hand gesture of an operator's hand to provide an input to said human machine interface based upon said hand gesture; and wherein said first and second touchless input sensors are each configured to detect at least first and second different hand gestures, wherein said first hand gesture corresponds with said first input to said industrial automation control system, said second hand gesture corresponds with said second input to said industrial automation control system, and said at least one touchless input device ignores said first hand gesture when said at least one touchless input device is in said first state.

2. The human machine interface for said industrial automation control system as set forth in claim 1, wherein one of said first and second hand gestures comprises a double tap gesture comprising two successive hand movements toward and away from the first and second touchless input sensors within a first select time period; and wherein the other of said first and second hand gestures comprises a double swipe gesture comprising two successive lateral hand movements laterally across the first and second touchless input sensors within a second select time period.

3. The human machine interface for said industrial automation control system as set forth in claim 2, wherein said first and second select time periods are each in the range of 500 milliseconds to 1000 milliseconds.

4. The human machine interface for said industrial automation control system as set forth in claim 1, wherein said first and second touchless input sensors are identical with respect to each other.

5. The human machine interface for said industrial automation control system as set forth in claim 1, wherein said first and second touchless input sensors are each time-of-flight sensors.

6. The human machine interface for said industrial automation control system as set forth in claim 1, wherein said first and second touchless input sensors are each time-of-flight photon sensors.

7. The human machine interface for said industrial automation control system as set forth in claim 1, further comprising at least one visual indicator light that is configured to illuminate a select color when the touchless input device is in one of the first and second states.

8. The human machine interface for said industrial automation control system as set forth in claim 1, further comprising a mechanical emergency stop switch operatively connected to said industrial automation control system and including at least one mechanical electric contact that provides an emergency stop signal to said industrial automation control system when actuated.

9. The human machine interface for said industrial automation control system as set forth in claim 1, wherein said at least one touchless input device ignores said second hand gesture when said at least one touchless input device is in said second state.

10. A method of controlling a human machine interface for an industrial automation control system, said method comprising:

setting a state of a touchless input device of the human machine interface to a first state and providing a first input to the industrial automation control system;

using first and second touchless sensors that are a same type of touchless sensor and operate in an alternating arrangement with respect to one another to detect a first hand gesture; and changing said state of said touchless input device from said first state to a second state and providing a second input to the industrial automation control system when both said first and second touchless sensors detect said first hand gesture, wherein said touchless input device ignores said first hand gesture when said touchless input device is in said second state.

11. The method of controlling the human machine interface for said industrial automation control system as set forth in claim 10, further comprising:

changing said state of said touchless input device from said second state back to said first state and providing said first input to the industrial automation control system when at least one of said first and second touchless sensors detects a second hand gesture that is different from the first hand gesture.

12. The method of controlling the human machine interface as set forth in claim 11, wherein said touchless input device ignores said second hand gesture when said touchless input device is in said first state.

13. A method of controlling a human machine interface for an industrial automation control system, said method comprising:

setting a state of a touchless Estop device of the human machine interface to a first state and providing a first input to the industrial automation control system;

using first and second touchless sensors that are a same type of touchless sensor and operate in an alternating arrangement with respect to one another to detect a first hand gesture;

changing said state of said touchless Estop device from said first state to a second state and providing a second input to the industrial automation control system when at least one of said first and second touchless sensors detects said first hand gesture; and wherein said second input to the industrial automation control system corresponds to an emergency stop command and said touchless Estop device ignores said first hand gesture when said touchless Estop device is in said second state.

14. The method of controlling the human machine interface for said industrial automation control system as set forth in claim 13, further comprising illuminating a visual indicator in a red color when said touchless Estop device is in said second state.

15. The method of controlling the human machine interface for said industrial automation control system as set forth in claim 13, further comprising:

changing said state of said touchless Estop device from said second state back to said first state and providing said first input to the industrial automation control system when both said first and second touchless sensors detect a second hand gesture that is different from said first hand gesture.

16. The method of controlling the human machine interface for said industrial automation control system as set forth in claim 15, wherein said touchless Estop device ignores said second hand gesture when said touchless Estop device is in said first state.

* * * * *